(12) United States Patent
Gruhlke

(10) Patent No.: US 8,009,221 B2
(45) Date of Patent: *Aug. 30, 2011

(54) MULTI-MAGNIFICATION COLOR IMAGE SENSOR

(75) Inventor: Russell W. Gruhlke, Fort Collins, CO (US)

(73) Assignee: Aptina Imaging Corporation, Grand Cayman (KY)

( * ) Notice: Subject to any disclaimer, the term of this patent is extended or adjusted under 35 U.S.C. 154(b) by 449 days.

This patent is subject to a terminal disclaimer.

(21) Appl. No.: 12/182,525

(22) Filed: Jul. 30, 2008

(65) Prior Publication Data

US 2009/0027540 A1 Jan. 29, 2009

Related U.S. Application Data

(63) Continuation of application No. 10/927,328, filed on Aug. 25, 2004, now Pat. No. 7,417,674.

(51) Int. Cl.
*H04N 5/222* (2006.01)
(52) U.S. Cl. .............................. 348/333.11; 348/333.12
(58) Field of Classification Search .............. 348/240.3, 348/340, 335, 333.11–333.12, 279–280
See application file for complete search history.

(56) References Cited

U.S. PATENT DOCUMENTS

| | | | |
|---|---|---|---|
| 5,005,083 A | 4/1991 | Grage et al. | |
| 6,137,100 A | 10/2000 | Fossum et al. | |
| 6,172,352 B1 | 1/2001 | Liu | |
| 6,611,289 B1 | 8/2003 | Yu et al. | |
| 6,833,873 B1 | 12/2004 | Suda | |
| 2001/0028730 A1 | 10/2001 | Nahata | |
| 2002/0113888 A1 | 8/2002 | Sonoda et al. | |
| 2003/0009086 A1 | 1/2003 | Black et al. | |

OTHER PUBLICATIONS

SIPO, Fifth Office Action of China State Intellectual Property Office, Jan. 29, 2010 and English Translation.
SIPO, Fourth Office Action of China State Intellectual Property Office, Oct. 16, 2009 and English Translation.
SIPO, Third Office Action of China State Intellectual Property Office, May 8, 2009 and English Translation.
SIPO, Second Office Action of China State Intellectual Property Office, Jan. 9, 2009 and English Translation.
SIPO, First Office Action of China State Intellectual Property Office, Aug. 8, 2008 and English Translation.

*Primary Examiner* — Tuan Ho
(74) *Attorney, Agent, or Firm* — RatnerPrestia

(57) ABSTRACT

A color image sensor has imaging elements each structured to form, at an image plane, an image of a subject having a respective magnification. Ones of the imaging elements forming respective ones of the images with the same magnification in light of mutually different colors constitute a set characterized by the magnification of the images. The sets having mutually-different magnifications. The color image sensor additionally has a light sensor located in the image plane and comprising a region of sensor elements disposed opposite each of the imaging elements. The regions of sensor elements opposite each of the sets of imaging elements are operable to generate, in response to light incident thereon, a respective color image signal representing the image of the subject at the respective magnification.

17 Claims, 9 Drawing Sheets

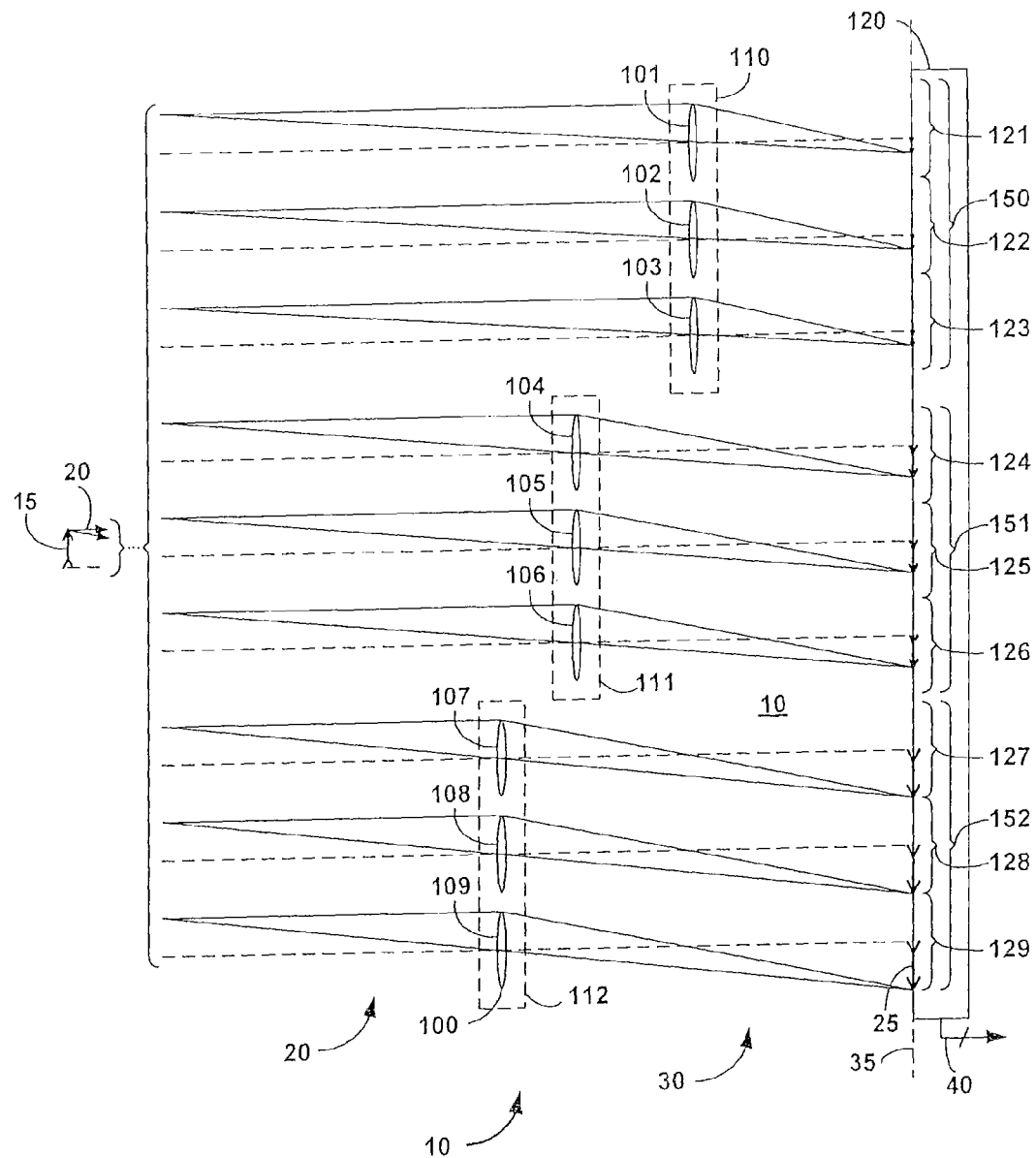
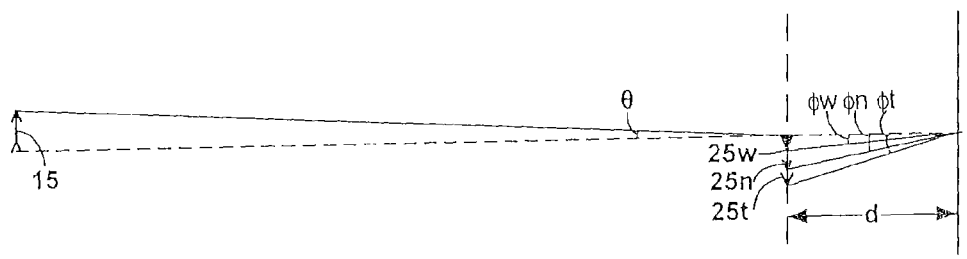
FIG. 1A
FIG. 1B

US 8,009,221 B2

MULTI-MAGNIFICATION COLOR IMAGE SENSOR

This application is a Continuation of U.S. application Ser. No. 10/927,328, filed Aug. 25, 2004, the contents of which are incorporated herein by reference.

BACKGROUND OF THE INVENTION

Cameras originally used interchangeable lenses having different focal lengths to give them the ability to form an image of a subject with a selected magnification.

Interchangeable lenses are inconvenient in many ways: the lenses themselves can be relatively bulky, the unused lenses need to be stored somewhere and the process of changing from one lens to another can be fiddly and time consuming.

More recently, cameras use a multi-element zoom lens to give them the ability to form an image of a subject with a selected magnification. A multi-element zoom lens uses a relatively complex mechanism to move two or more of the lens elements non-linearly relative to the image plane to keep the image in focus as the focal length of the zoom lens is changed to change the magnification. This mechanism occupies more space than is available in a miniature camera lens.

Miniature cameras having electronic image sensors are incorporated not only in digital cameras but also, more recently, into such consumer electronic products as mobile telephones and personal digital assistants (PDAs). Such products are subject to market pressure to make them ever smaller, or to pack more features into a product of a given size. U.S. patent application Ser. No. 10/741,774 of Schroeder et al. entitled Color Image Sensor with Imaging Elements on Respective Regions of Sensor Elements and U.S. patent application Ser. No. 10/740,935 of Gruhlke et al. entitled Color Image Sensor having Imaging Element Array Forming Images on Respective Regions of Sensor Elements describe a small color image sensor suitable for use in a single magnification digital camera. These applications are assigned to the assignee of this application and are incorporated herein by reference. These applications disclose a single-magnification color image sensor that has multiple sensor and lens combinations, each of which forms an image of the subject in a narrow band of light. This allows the lenses to be physically smaller and located closer to the image plane than a conventional multi-element polychromatic lens, and eliminates the conventional mosaic color filter and its attendant problems.

A market demand exists for a simple, compact color image sensor system having the capability of forming an image a subject with a selected magnification without the need to change a lens or to move lens elements relative to one another in the image sensor system. There is also a market demand for a capability of displaying a picture of a subject at more than one magnification in a consumer electronic product such as a digital camera or cell phone display.

SUMMARY OF THE INVENTION

The invention provides in a first aspect a color image sensor having imaging elements each structured to form, at an image plane, an image of a subject having a respective magnification. Ones of the imaging elements forming respective ones of the images with the same magnification in light of mutually different colors constitute a set characterized by the magnification of the images. The sets have mutually-different magnifications. The color image sensor additionally has a light sensor located in the image plane. The light sensor has a region of sensor elements disposed opposite each of the imaging elements. The regions of sensor elements opposite each of the sets of imaging elements are operable to generate in, response to light incident thereon, a respective color image signal representing the image of the subject at the respective magnification.

The invention provides in a second aspect a color imaging method including forming images of a subject including forming the images in sets. The images in each of the sets are formed in light of mutually different colors and have the same magnification. The images differ in magnification among the sets. The method additionally includes generating a respective color image signal in response to each of the sets of the images, the color image signal representing the subject at the respective magnification.

The invention provides in a third aspect a system for generating color images has means for forming images of a subject in sets. The images in each of the sets are formed in light of mutually different colors and have the same magnification. The images differ in magnification among the sets. The system additionally has means for generating a respective color image signal in response to each of the sets of the images, the color image signal representing the subject at the respective magnification.

The above and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIG. 1A is a schematic diagram of a multi-magnification color image sensor in accordance with the invention;

FIG. 1B is a schematic diagram indicating the angles subtended by the images formed by a multi-magnification color image sensor in accordance with the invention;

DETAILED DESCRIPTION

Figure 2:
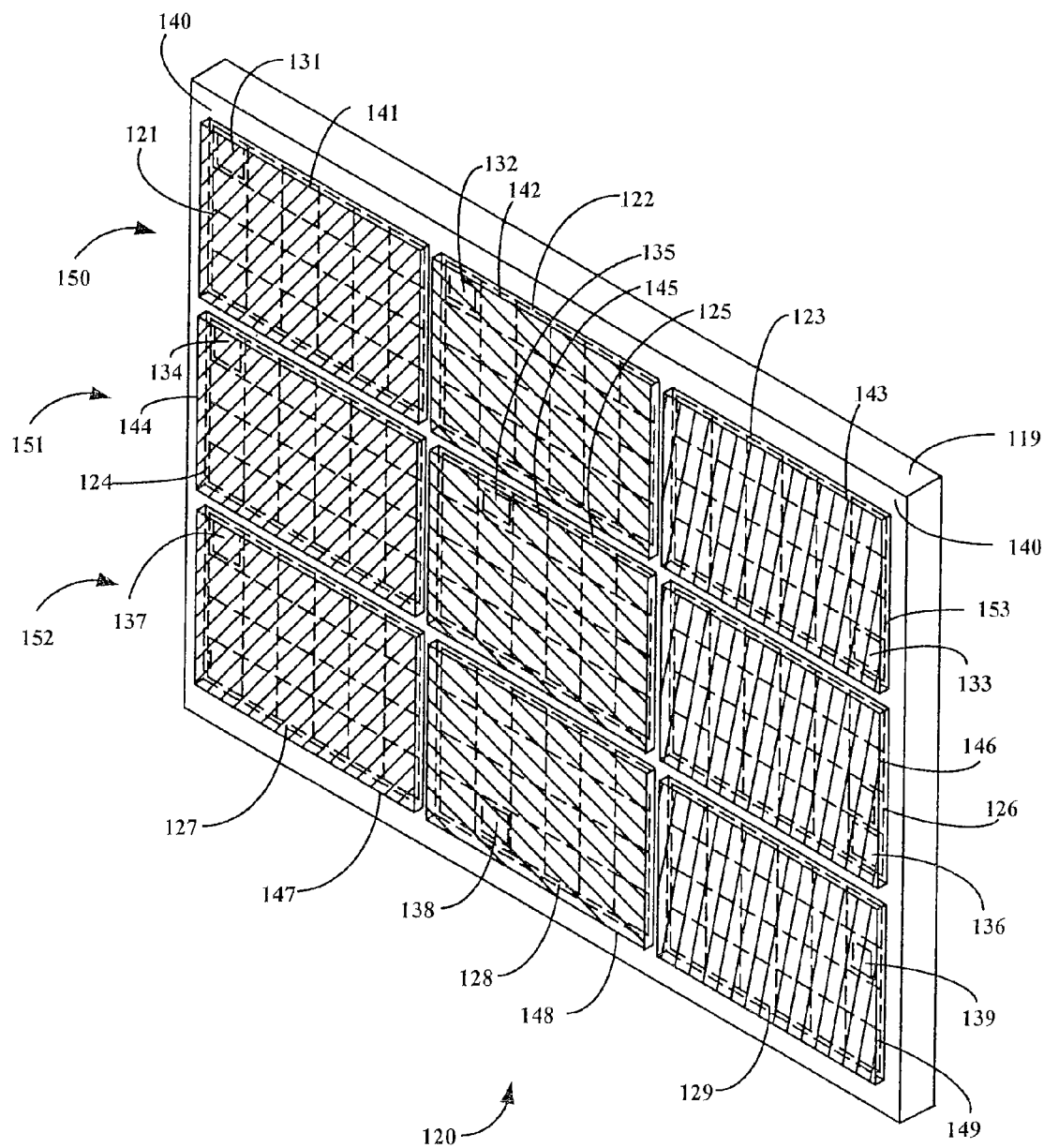
FIG. 2 is an isometric view of the light sensor of a multi-magnification color image sensor in accordance with a first embodiment of the invention.

FIG. 1A is a schematic diagram of an embodiment of a multi-magnification color image sensor 10 in accordance with the invention. Color image sensor 10 is composed of imaging elements 101-109 and a light sensor 120 located in the common image plane 35 of the imaging elements. The imaging elements 101-109 each image light 20 from a subject 15 on light sensor 120 as light 30. The light sensor 120 generates color image signals 40 in response to the incident light 30. Each of the imaging elements 101-109 is structured to form a respective image of the subject 15 at the image plane 35. An exemplary image is indicated by the reference numeral 25. The image has a magnification. Those of the imaging elements that form images with the same magnification in light of mutually different colors constitute a set of imaging elements characterized by a magnification. The sets of imaging elements have mutually-different magnifications.

The light sensor 120 is located in the image plane 35 and has a region of light sensor elements disposed opposite each of the imaging elements 101-109. Each region of light sensor elements generates an image signal component that represents an image of the subject in one color of light and at one magnification. The regions of light sensor elements opposite each set of imaging elements collectively generate a color image signal that represents the image of the subject at the respective magnification.

In the example shown in FIG. 1A, wide-angle imaging elements 101, 102 and 103 that form images with the same magnification in red, green and blue light, respectively, constitute a set 110 of imaging elements; normal imaging elements 104, 105 and 106 that form images with the same magnification in red, green and blue light, respectively, constitute a set 111 of imaging elements and telephoto imaging elements 107, 108 and 109 that form images with the same magnification in red, green and blue light, respectively, constitute a set 112 of imaging elements.

In light sensor 120, regions 121, 122 and 123 of light sensor elements are disposed opposite wide-angle imaging elements 101, 102 and 103, respectively, and constitute a group 150 of regions. Regions 124, 125 and 126 of light sensor elements are disposed opposite normal imaging elements 104, 105 and 106, respectively, and constitute a group 151 of regions. Regions 127, 128 and 129 of light sensor elements are disposed opposite telephoto imaging elements 107, 108 and 109, respectively, and constitute a group 152 of regions. The regions 121, 122 and 123 of light sensor elements in group 150 opposite the set 110 of vide-angle imaging elements collectively generate a color image signal representing a wide-angle image of the subject. The magnification of the wide-angle image of the subject is that produced by the imaging elements in set 110. The regions 124, 125 and 126 of light sensor elements in group 151 opposite the set 111 of normal imaging elements collectively generate a color image signal representing a normal image of the subject. The magnification of the normal image of the subject is that produced by the imaging elements in set 111. The regions 127, 128 and 129 of light sensor elements in group 152 opposite the set 112 of telephoto imaging elements collectively generate a color image signal representing a telephoto image of the subject. The magnification of the telephoto image of the subject is that produced by the imaging elements in set 112.

As used in this disclosure, the magnification of an image of a subject will be taken to mean the ratio of the angle subtended by the image at a standardized viewing distance, e.g., 300 mm, from image plane 35 and the angle subtended by the subject at image plane 35. FIG. 1B shows the angles $\phi w$, $\phi n$ and $\phi t$ subtended by the images 25$w$, 25$n$ and 25$t$, respectively, formed by wide-angle imaging element set 110, normal imaging element set 111 and telephoto imaging element set 112, respectively, at a standardized viewing distance d from image plane 35. FIG. 1B also shows the angle $\theta$ subtended by the subject 15 at image plane 35. The magnifications of the images produced by set 110 of wide-angle imaging elements, set 111 of normal imaging elements and set 112 of telephoto imaging elements are $\phi w/\theta$, $\phi n/\theta$ and $\phi t/\theta$, respectively.

FIG. 2 is an isometric view of the light sensor 120 of a multi-magnification color image sensor 10 in accordance with a first embodiment of the invention. Light sensor 120 has group 150 composed of regions 121-123 of sensor elements, group 151 composed of regions 124-126 of sensor elements and group 152 composed of regions 127-129 of sensor elements arranged on its major surface 140. In light sensor 120, the regions 121-129 of sensor elements are arranged in a rectangular array and each of the regions 121-129 is composed of a rectangular array of sensor elements. Broken lines indicate the boundary of an exemplary sensor element 131 in region 121, an exemplary sensor element 132 in region 122, an exemplary sensor element 133 in region 123, an exemplary sensor element 134 in region 124, an exemplary sensor element 135 in region 125, an exemplary sensor element 136 in region 126, an exemplary sensor element 137 in region 127, an exemplary sensor element 138 in region 128, and an exemplary sensor element 139 in region 129. Additional broken lines, such as the broken line 153 indicate the boundaries between adjacent ones of the sensor elements in each of the regions 121-129. In the descriptions of this embodiment and the embodiments described below, the reference numeral of the exemplary sensor element in each region will additionally be used to refer to all the sensor elements in the region. Each sensor element is a complementary metal-oxide-semiconductor (CMOS) sensor element. Each sensor element may alternatively be a charge-coupled device (CCD) sensor element or another suitable type of sensor element that generates an electrical signal in response to incident light.

Each region 121-129 of sensor elements is covered with a respective color filter 141-149. Light filters 141, 144 and 147 transmit light of a first color to regions 121, 124 and 127, respectively. Light filters 142, 145 and 148 transmit light of a second color to regions 122, 125 and 128, respectively. Light filters 143, 146 and 149 transmit light of a third color to regions 123, 126 and 129 respectively. Thus, in each of the groups 150, 151 and 152 of regions, each of the regions is covered by a color filter that transmits light of a color mutually different from those transmitted by the color filters covering the other two regions.

The example of light sensor 120 shown in FIG. 2 is highly simplified in that each of its regions 121-129 has only 24 sensor elements. A typical example of light sensor 120 has hundreds of thousands or millions of sensor elements 131-139 in each of regions 121-129.

In light sensor 120, regions 121-129 are equal in linear dimensions and area. In an alternative embodiment, regions 121 and 123 have fewer sensor elements and are smaller in linear dimensions and area than sensor region 122, regions 124 and 126 have fewer sensor elements and are smaller in linear dimensions and area than sensor region 125 and regions 127 and 129 have fewer sensor elements and are smaller in linear dimensions and area than sensor region 128. In such alternative embodiment, regions 122, 125 and 128 receive light closer to the center of the visible spectrum than the remaining regions. In another alternative, the regions 121 and 123 have fewer sensor elements than regions 122, regions 134 and 136 have fewer sensor elements than regions 135 and regions 137 and 139 have fewer sensor elements than regions 138. Again, regions 122, 125 and 128 receive light closer to the center of the visible spectrum than the remaining regions. In another alternative, the sensor elements in regions 121-123 differ in area to equalize the spectral sensitivity of the regions 121-123; the sensor elements in regions 124-126 differ in area to equalize the spectral sensitivity of the regions 124-126 and the sensor elements in regions 127-129 differ in area to equalize the spectral sensitivity of the regions 127-129. In another alternative, the sensor elements in groups 150, 151 and 152 differ in area among the groups to equalize sensitivity despite differences in the numeric apertures (f-numbers) of the sets of the imaging elements associated with the groups.

Light sensor 120 is composed of a silicon substrate 119 on which sensor elements similar to sensor elements 131-139 are fabricated in regions 121-129, respectively, using conventional semiconductor processing. Portions of the sensor elements may be located in substrate 119, but will be regarded as being "on" the substrate for the purpose of the following description. In one embodiment, portions of the substrate outside regions 121-129 in which the sensor elements 131-139 are located are occupied by circuits such as exposure control circuits and signal processing circuits that process the image signal components and/or the color image signal derived from the image signal components.

Each of the regions 121-129 of light sensor 120 has an associated read-out circuit (not shown). Each read-out circuit receives the electrical values generated by the sensor elements 131-139 in response to light from the subject and converts the electrical values into an analog or digital image signal component, typically in raster-scan order. Alternatively, light sensor 120 may have a single read-out circuit common to the regions 121-129 of sensor elements 131-139. The read-out circuits are typically fabricated on the substrate 119 and may underlie the sensor elements. After the sensor elements and associated read-out circuits have been fabricated on substrate 119, color filters 141-149 of different colors are applied to the major surface 140 of the substrate 119.

In an alternative embodiment, each of the groups 150, 151 and 152 of regions of light sensor 190 is fabricated on an individual substrate (not shown). Each substrate may additionally have fabricated thereon one or more circuits associated with the sensor elements, as described above. The individual substrates are then mounted on a board, such as a printed circuit board, that defines positional relationships among the substrates.

In an alternative embodiment, the regions 121-129 are arranged in a positional relationship that minimizes the leakage of light imaged by each of the imaging elements 101-109 on regions 121-129 of sensor elements, respectively, onto another of the regions. Such light leakage is undesirable as it forms "ghosts" in any picture displayed in response to the color image signal generated by color image sensor 100. One exemplary positional relationship that minimizes the leakage of light has an increased physical separation between the regions 121-129. Another positional relationship that minimizes the leakage of light positions the regions 121-129 so that adjacent ones of the regions are adjacent at their corners instead of at their sides as shown in FIG. 2. This allows the sides of the regions 121-129 to be physically separated by a distance approximately equal to the width or length of the regions 121-129. Baffles similar to those illustrated in the above-mentioned U.S. patent application Ser. No. 10/741, 774 may alternatively or additionally be used.

Figure 3:
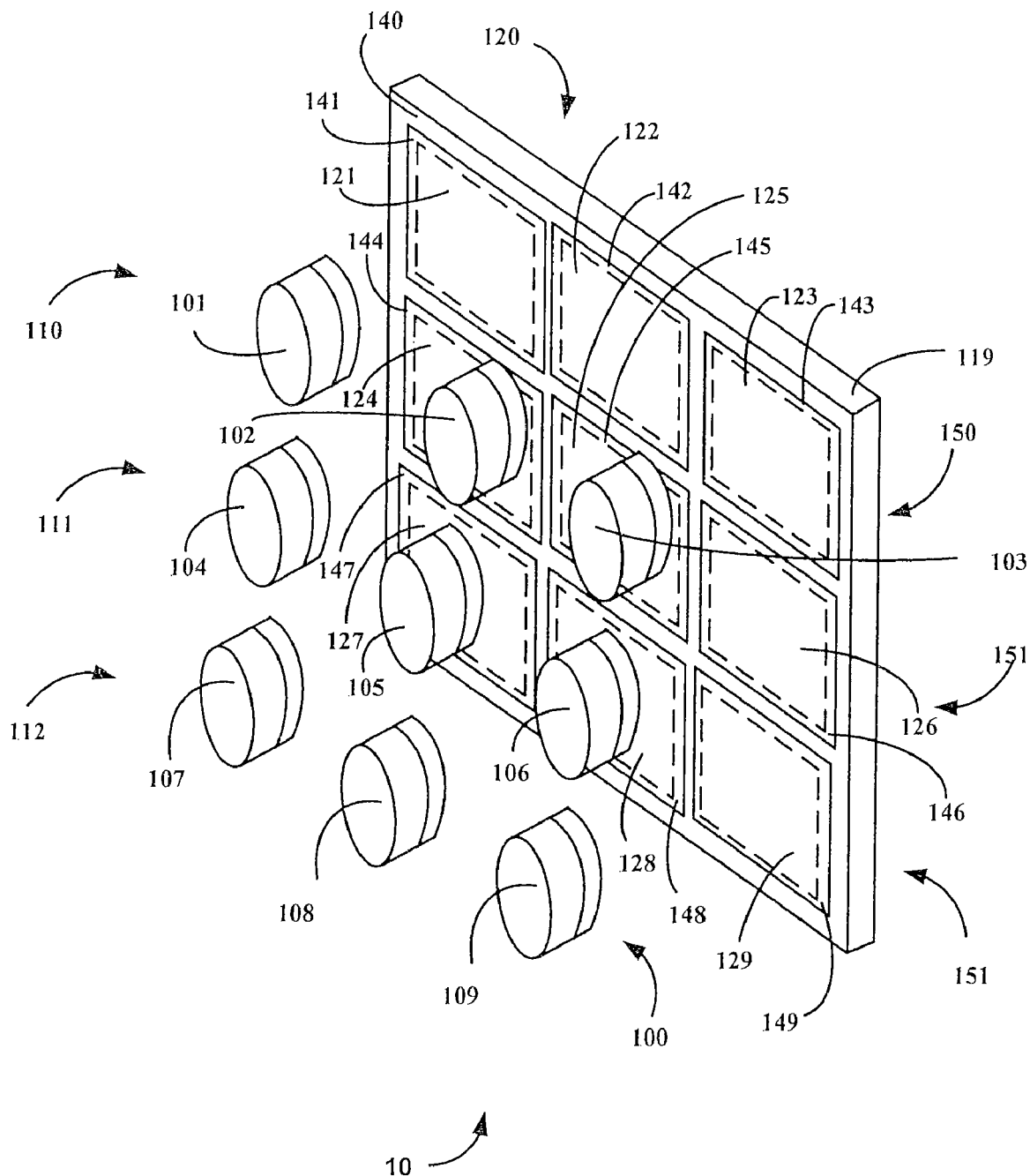
FIG. 3 is an isometric view of the light sensor and the imaging elements of a color image sensor in accordance with the first embodiment of the invention.
Figure 4:
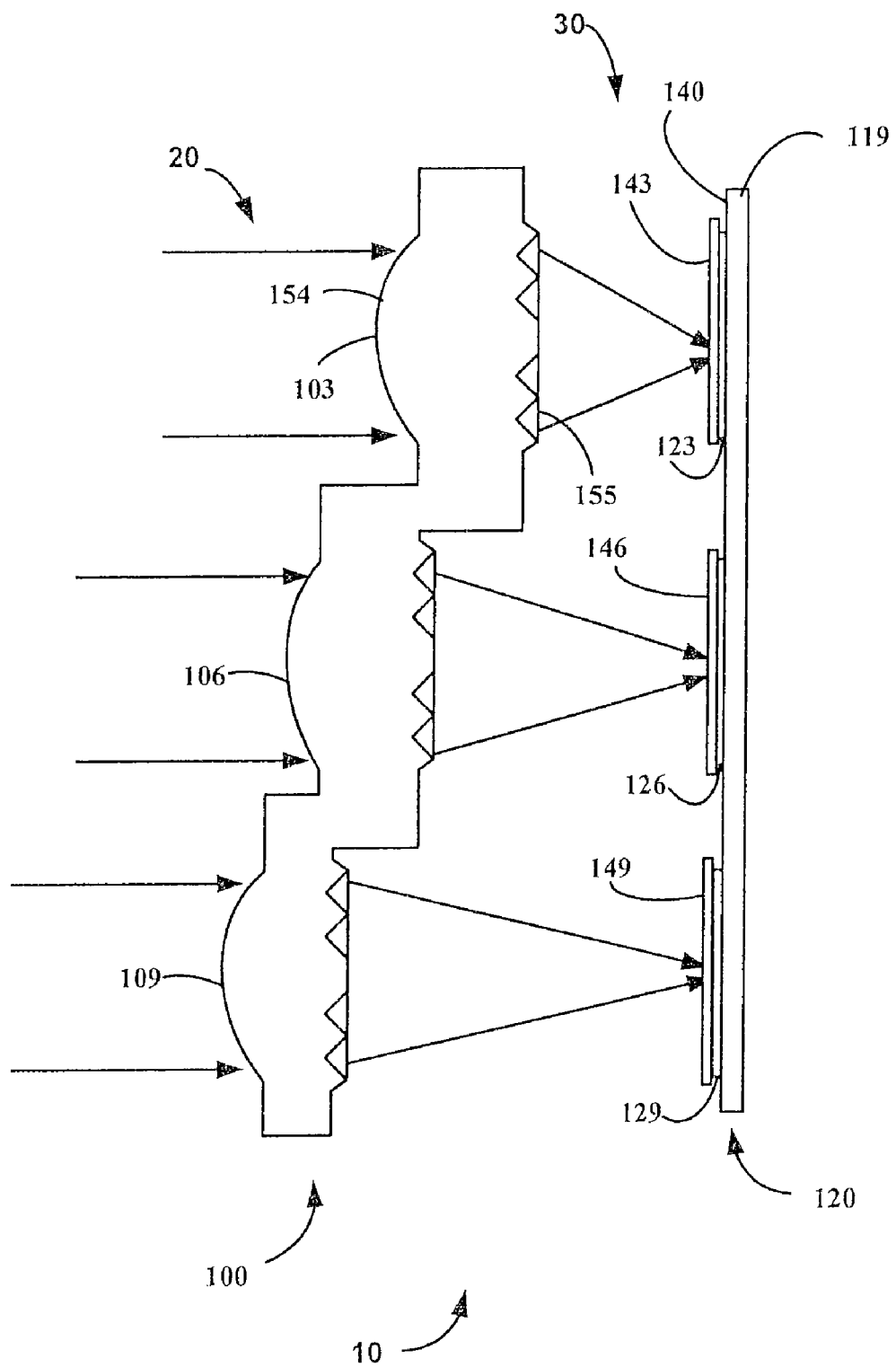
FIG. 4 is a side view of the light sensor and the imaging elements of a color image sensor in accordance with the first embodiment of the invention.

FIG. 3 is an isometric view of the light sensor 120 and the imaging elements 101-109 of a color image sensor 10 in accordance with the first embodiment of the invention. The sensor elements 131-139 in the regions 121-129 of the light sensor 120 are not illustrated in FIG. 3 to simplify the drawing. The boundaries of the regions 121-129 are indicated with dashed lines. FIG. 4 is a side view of the light sensor 120 and the imaging elements 100 of a color image sensor 10 in accordance with the first embodiment of the invention. The side view of FIG. 4 shows imaging elements 103, 106 and 109 and respective regions 123, 126 and 129 of the sensor elements of light sensor 120. Light 20 from the subject (not shown) is focused by imaging elements 103, 106 and 109 onto regions 123, 126 and 129 as light 30. Regions 123, 126 and 129 are disposed opposite the imaging elements 103, 106 and 109. The light filters 143, 146, and 149 are shown located on the surfaces of regions 123, 126 and 129, respectively, between imaging elements 103, 106 and 109 and regions 123, 126 and 129, respectively.

The imaging elements 101-109 each have a refractive surface and a diffractive surface. For example, imaging element 103 has a spherical refractive front surface 154 and a diffractive back surface 155. The front surface of the lens is the surface on which light 20 is incident. The diffractive surface corrects for optical aberrations, such as spherical aberration, introduced by the refractive front surface. Imaging elements 101, 102 and 104-108 are similar in structure and will not be separately described. In an alternative embodiment, the imaging elements 101-109 each have a spherical refractive front surface and an aspherical refractive back surface. Other configurations for imaging elements 101-109 are possible.

Color filters 141-149 are located on the major surface 140 of the light sensor 120 between imaging elements 101-109 and respective regions 121-129 of sensor elements. In an alternative arrangement, color filters 141-149 are independently supported between imaging elements 101-109 and respective regions 121-129 of sensor elements. In another alternative arrangement, color filters 141-149 are supported by imaging elements 101-109, respectively. In another arrangement, color filters 141-149 are located between the subject and imaging elements 101-109, respectively. Other arrangements are possible. Regardless of the actual arrangement of the imaging element, the region and the color filter, light that passes through imaging element 103, for example, and is incident on region 123 of light sensor 120 additionally passes through color filter 143, and similarly for the remaining imaging elements, regions and color filters.

The imaging elements 101-109 have a one-to-one relationship with regions 121-129 of light sensor 120. The imaging elements 101-109 are arranged to form respective images in the common image plane 35 (FIG. 1A), and light sensor 120 is located at the common image plane. In this configuration, sets of three imaging elements 101-103, 104-106 and 107-109 are disposed opposite respective groups of three regions 121-123, 124-126 and 127-129 of sensor elements.

Referring again to FIGS. 1A and 2, the imaging elements 101-103 constituting set 110 of imaging elements form respective images at the image plane of the subject at a first magnification in light of mutually different colors. The imaging elements 101-103 constituting the set 110 of imaging elements each have a first focal length and are positioned opposite the regions 121-123, respectively, of light sensor 120 that constitute a first group 150 of regions. Imaging elements 101-103 are spaced from light sensor 120 by a distance approximately equal to the first focal length. The first focal length defines a first magnification.

The imaging element 101 is structured to focus light of a first color from the subject to form an image of the subject at the first magnification in the light of the first color. The light 30 passes through color filter 141 to illuminate the sensor elements 131 in the region 121 of the light sensor 120. Region 121 is operable to generate a first color image signal component that represents the image of the subject at the first magnification in response to the light of the first color incident thereon.

The imaging element 102 is structured to focus light of a second color from the subject to form an image of the subject at the first magnification in the light of the second color. The light 30 passes through color filter 142 to illuminate the sensor elements 132 in the region 122 of the light sensor 120. Region 122 is operable to generate a second color image signal component that represents the image of the subject at the first magnification in response to the light of the second color incident thereon.

The imaging element 103 is structured to focus light of a third color from the subject to form an image of the subject at the first magnification in the light of the third color. The light 30 passes through color filter 143 to illuminate the sensor elements 133 in the region 123 of light sensor 120. Region 123 is operable to generate a third color image signal component that represents an image of the subject at the first magnification in response to the light of the third color incident thereon.

The first color, second color and third color are mutually different. The first, second and third color image signal components generated by the set of regions 121-123 are electronically combined to form a color image signal that represents the image of the subject at the first magnification. White is regarded as a color.

The imaging elements 104-106 constituting set 111 of imaging elements form respective images at the image plane of the subject at a second magnification in light of mutually different colors. The second magnification is different from the first magnification. The imaging elements 104-106 constituting set 111 of imaging elements each have a second focal length and are positioned opposite the regions 124-126, respectively, of light sensor 120 that constitute a second group 151 of regions. The second focal length is different from the first focal length. Imaging elements 104-106 are spaced from light sensor 120 by a distance approximately equal to the second focal length. The second focal length defines a second magnification The imaging element 104 is structured to focus light of the first color from the subject to form an image of the subject at the second magnification in the light of the first color. The light 30 passes through color filter 144 to illuminate the sensor elements 134 in the light sensors in the region 124 of light sensor 120. Region 124 is operable to generate a first color image signal component that represents the image of the subject at the second magnification in response to the light of the first color incident thereon.

The imaging element 105 is structured to focus light of a second color from the subject to form an image of the subject at the second magnification in the light of the second color. The light 30 passes through color filter 145 to illuminate the sensor elements 135 in the region 125 of the light sensor 120. Region 125 is operable to generate a second color image signal component that represents the image of the subject at the second magnification in response to the light of the second color incident thereon.

The imaging element 106 is structured to focus light of a third color from the subject to form an image of the subject at the second magnification in the light of the third color. The light 30 passes through color filter 146 to illuminate the sensor elements 136 in the region 126 of light sensor 120. Region 126 is operable to generate a third color image signal component that represents an image of the subject at the second magnification in response to the light of the third color incident thereon.

The first, second and third color image signal components generated by set of regions 124-126 are electronically combined to form a color image signal that represents the image of the subject at the second magnification.

The imaging elements 107-109 constituting set 112 of imaging elements form respective images at the image plane of the subject at a third magnification in light of mutually different colors. The imaging elements 107-109 constituting the set 112 of imaging elements each have a third focal length and are positioned opposite the regions 127-129, respectively, of light sensor 120 that constitute a third group 153 of regions. The third focal length is different from the first focal length and the second focal length. Imaging elements 107-109 are spaced from the light sensor 120 by a distance approximately equal to the third focal length. The third focal length defines a third magnification.

The imaging element 107 is structured to focus light of a first color from the subject to form an image of the subject at the third magnification in the light of the first color. The light 30 passes through color filter 147 to illuminate the sensor elements 137 in the region 127 of light sensor 120. Region 127 is operable to generate a first color image signal component that represents the image of the subject at the third magnification in response to the light of the first color incident thereon.

The imaging element 108 is structured to focus light of a second color from the subject to form an image of the subject at the third magnification in the light of the second color. The light 30 passes through color filter 148 to illuminate the sensor elements 138 in the region 128 of light sensor 120. Region 128 is operable to generate a second color image signal component that represents the image of the subject at the third magnification in response to the light of the second color incident thereon.

The imaging element 109 is structured to focus light of a third color from the subject to form an image of the subject at the third magnification in the third color. The light 30 passes through color filter 149 to illuminate the sensor elements 139 in the region 129 of light sensor 120. Region 129 is operable to generate a third color image signal component that represents an image of the subject at the third magnification in response to the light of the third color incident thereon.

The first, second and third color image signal components generated by the set of regions 127-129 are electronically combined to form a color image signal that represents the image of the subject at the third magnification.

The color image sensor 10 is thus capable of forming images of a subject. The images are formed in sets. The images in each of the sets are formed in light of mutually different colors and have the same magnification. The images differ in magnification among the set. The color image sensor 10 is also capable of generating respective color image signals in response to each of the sets of images. The color image signals represent the subject at a respective magnification.

The set 112 of imaging elements located farthest from the light sensor 120 provide the highest magnification. In an exemplary color image sensor, the set 110 composed of wide-angle imaging elements 101-103 provides a first magnification. The set 111 composed of normal imaging elements 104-106 provides a second magnification of approximately 1.7 times the first magnification. The set 112 composed of telephoto imaging elements 107-109 provides a third magnification of approximately 3.6 times the first magnification.

In the described embodiment, the sets of imaging elements are each composed of three imaging elements arranged in a row, but other numbers and positional relationships of the imaging elements are possible. In an alternative embodiment, each set of imaging elements is composed of four or more lens elements having the same focal length. The light sensor 120 has, for each set of imaging elements, four or more regions of sensor elements each having a respective color filter. In this alternative embodiment, each set of imaging elements forms respective images in light of four or more mutually different colors, and the light sensor generates color image signals that represent images of the subject at respective magnifications. Another embodiment has additional sets of imaging elements. Each additional set of imaging elements is operable to form respective images at the image plane of the subject at an additional magnification in light of mutually different colors.

Figure 5:
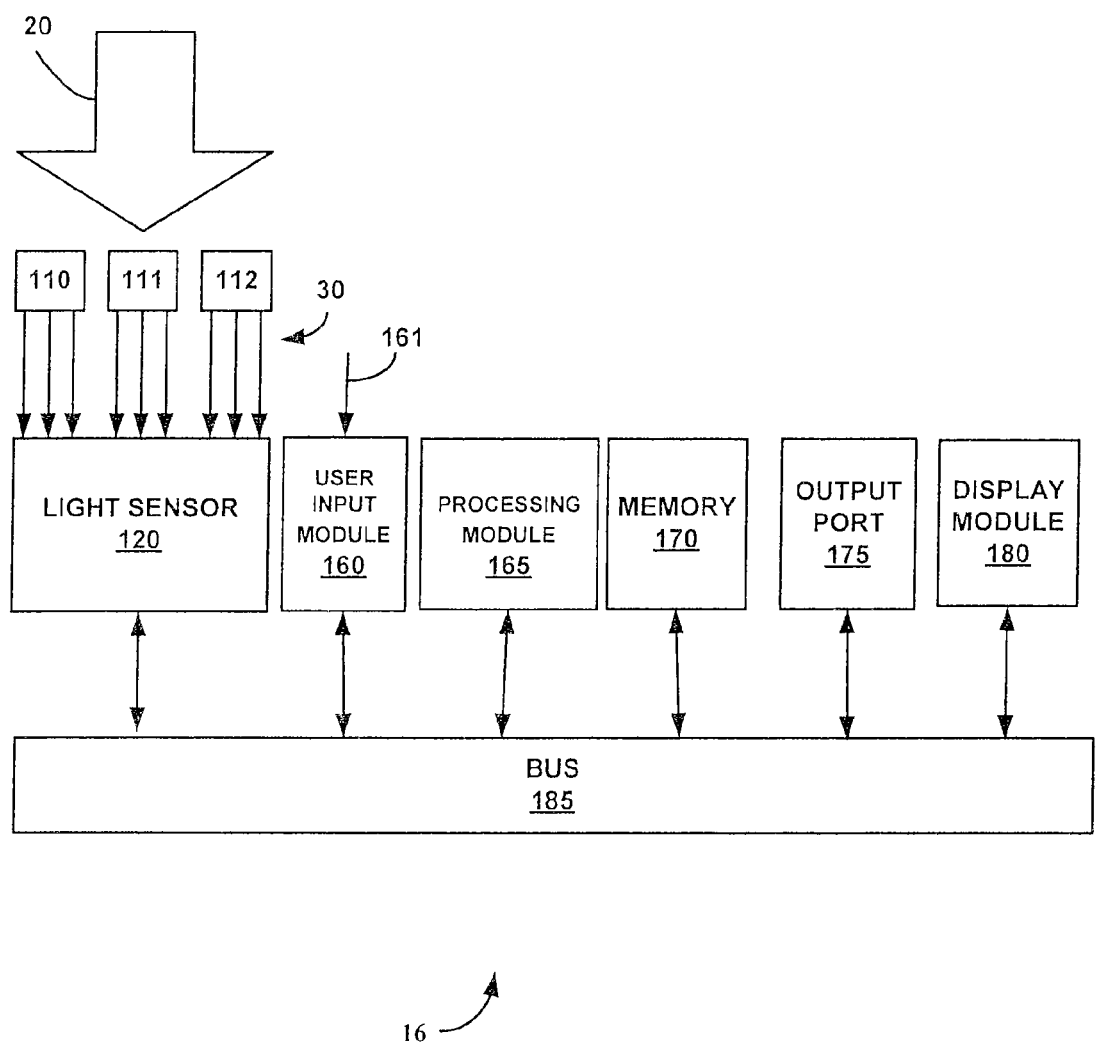
FIG. 5 is a block diagram of a multi-magnification color image sensor in accordance with a second embodiment of the invention.

FIG. 5 is a block diagram of a multi-magnification color image sensor 16 in accordance with a second embodiment of the invention. Elements of the color image sensor 16 that correspond to elements of the color image sensor 10 described above with reference to FIGS. 1A, 1B, 2, 3 and 4 are indicated using the same reference numerals and will not be described again here. Color image sensor 16 has sets 110, 111, and 112 of imaging elements, light sensor 120, a user input module 160, a processing module 165, a memory 170, an output port 175, a display module 180 and a bus 185. Bus 185 interconnects light sensor 120, the user input module 160, the processing module 165, the memory 170, the output port 175 and the display module 180. Bus 185 may be an electrical connection or an optical connection.

Light sensor 120 generates color image signals that represent images of a subject with different magnifications as described above with reference to FIGS. 1A, 2, 3 and 4. In the following example, the light sensor 120 outputs color image signals. In other examples, the light sensor 120 outputs image signal components, which are subsequently electronically combined by the processing module 165 or an external processor (not shown) to form color image signals each of which represents an image of the subject with a different magnification.

The user input module 160 is structured to receive a user input 161 from a user (not shown) of the color image sensor 16 and to select at least one of the color image signals in response to the user input 161. The user input module 160 includes one or more processors and/or one or more switches.

The user input 161 may be input to the user input module 160 when the user enters one or more keystrokes on a keypad or when the user rotates a knob to indicate a selection. In one embodiment, the user provides the user input 161 to input module 160 by pushing a button to display a menu on display module 180. In this latter embodiment, the user indicates which image or images to display, store, process and/or output by selecting one or more of the items in the menu.

In one embodiment, the user input module 160 is structured to generate one or more command signals in response to the user input 161. The command signals are transmittable via bus 195 to various ones of the devices, such as, a light sensor 120, processing module 165, memory 170, output port 175 and display module 180, connected to the bus 185.

The user provides a user input 161 to select one or more of the images formed by the sets 110, 111 and 112 of imaging elements for display by display module 180. Additionally, the user may provide a user input 161 to select one or more of the images formed by the sets 110, 111 and 112 of imaging elements for storage in memory 170. Additionally, the user may provide a user input 161 to select one or more of the images formed by the sets 110, 111 and 112 of imaging elements for output from output port 175 to an external device (not shown). Additionally, the user may provide a user input 161 to select one or more of the images formed by the sets of imaging elements 110, 111 and 112 for processing by processing module 165.

The selected color image signals output by light sensor 120 are transmitted via bus 185. The processing module 165 is structured to receive the transmitted color image signals output by light sensor 120 and to modify the received color image signals. Processing module 165 is structured to apply color correction to at least one of the color image signals. The processing module 165 includes one or more processors. Processing module 165 has capability to perform multiple processes. The processes include compressing the image signal components and/or color image signals, converting the color image signals to a JPEG or MPEG-format color image signals, etc. and summing and color correction processes.

In one embodiment, the processing module 165 is structured to receive transmitted command signals output by user input module 160. In one embodiment, the processing module 165 is structured to generate one or more command signals in response to a signal from the user input module 160. The command signals are transmittable to various devices, such as, light sensor 120, memory 170, output port 175 and display module 180 connected to the bus 185.

Memory 170 is structured to store at least one of the color image signals. Memory 170 is structured to receive all or selected ones of the color image signals transmitted via bus 185 responsive to a user input 161 indicating user selection of an option to store the color image signals. Memory 170 includes one or more memory devices, such as, random access memory (RAM), read-only memory (ROM). In one embodiment, memory 170 is structured to receive transmitted command signals output by user input module 160 and/or processing module 165. In one embodiment, selected stored color image signals are retrieved and/or deleted from memory 170 responsive to command signals generated by a user input 161 indicating user selection of an option to retrieve and/or delete selected color image signals.

Display module 180 is structured to receive the selected color image signals transmitted via bus 185 responsive to a selection at the user input module 160. Display module 180 is structured to display a picture in response to each of the at least one color image signals selected. Additionally, if the user selected to display more than one color image signal, the display module 180 is structured to simultaneously display more than one picture in response to selecting more than one color image signal. In one embodiment, display module 180 is structured to receive transmitted command signals output by user input module 160 and/or processing module 165 and to display pictures in the display module 180 responsive to the one or more color image signals and received command signal.

Output port 175 is structured to receive the selected color image signals transmitted via bus 185 responsive to a user input 161 indicating user selection of an option to output selected color image signals to an external device (not shown). Alternatively, selection can be made on the external device. The output port 175 is structured to output received color image signals to one or more external devices. In one embodiment, output port 175 is structured to receive image signal components from the light sensor 120 and/or from memory 170 and to output received image signal components to one or more external devices. An external processor (not shown) within the external device then electronically combines the output image signal components to form one or more color image signals.

The external devices may be a personal computer, a PDA, a cell phone or other electronic devices with display capability. The transmission from output port 175 may be via a wireless connection, such as, WiFi or a wireless communication system for cellular technology. The transmission from output port 175 may be via a hardwired connection, such as, a cable connection to a computer, a cable connection to an external memory device or a connection to a telecommunication system including wide area networks, local area networks. The connection to a telecommunication system may include landline and/or wireless connections.

In one embodiment, the bus 185 simultaneously delivers the selected color image signals to the processing module 165, the display module 180, memory 170, output port 175 or any combination thereof. In another embodiment, the bus 185 simultaneously delivers selected color image components, which can be electronically combined to form a color image signal, to the processing module 165, the display module 180, memory 170, output port 175 or any combination thereof.

Figure 6:
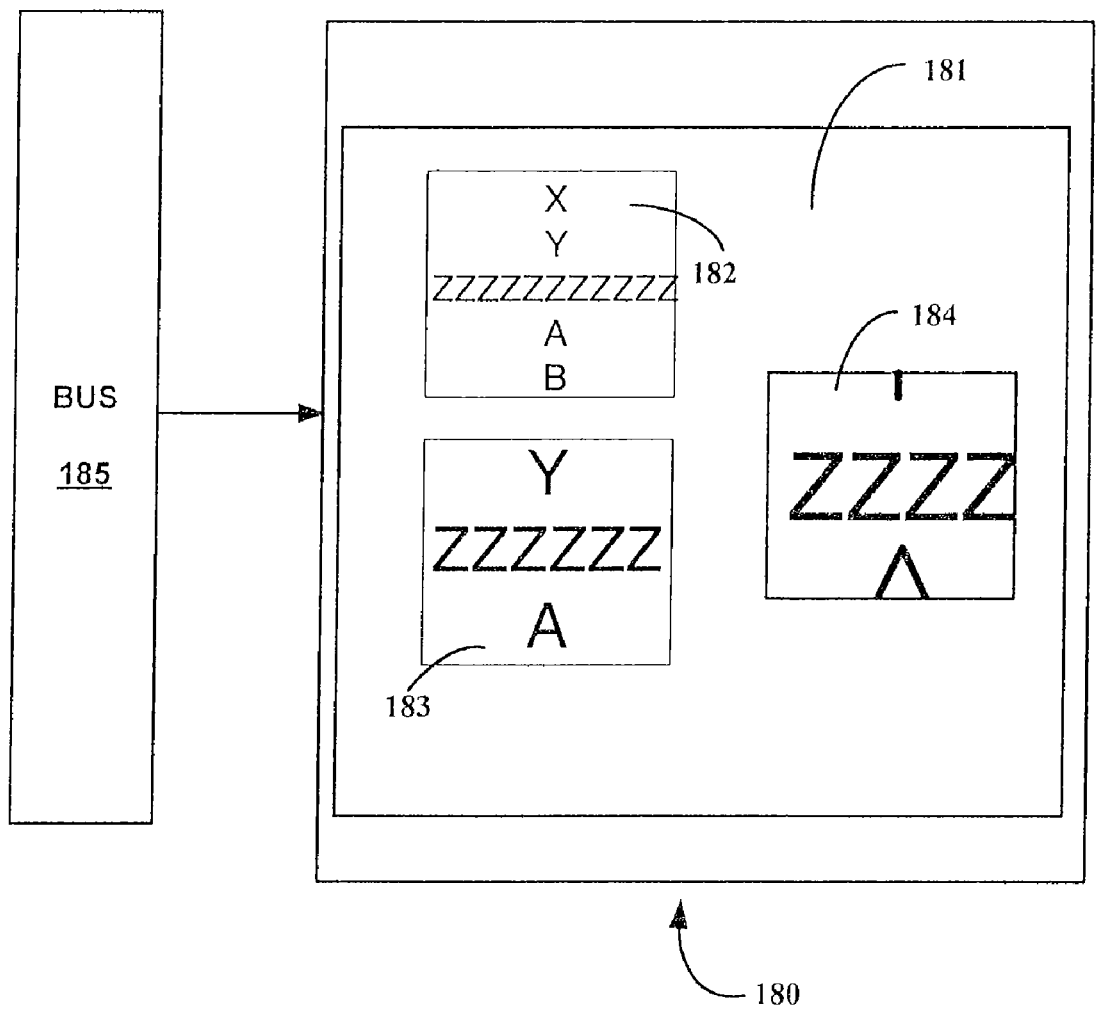
FIG. 6 is a schematic diagram of the display in operation showing a picture with three different magnifications.
Figure 7:
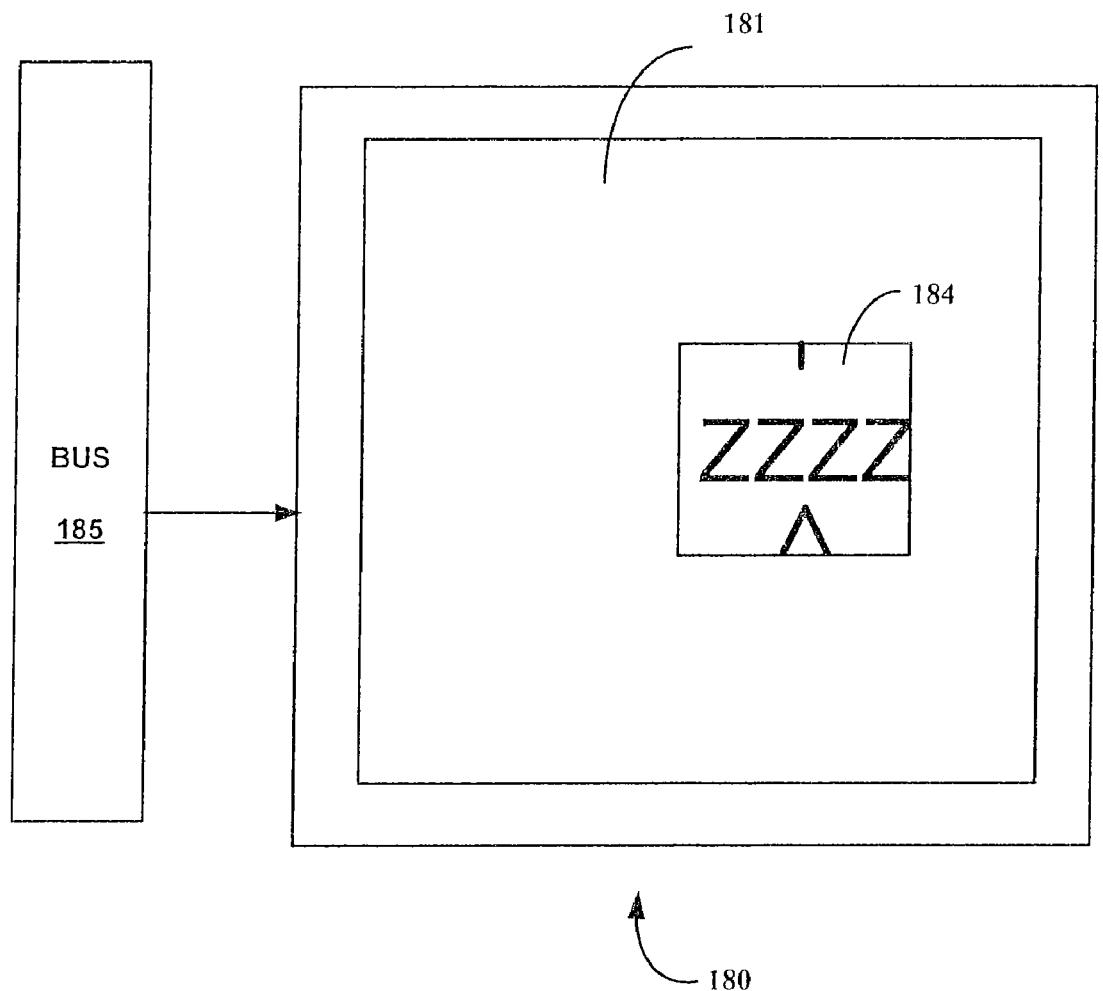
FIG. 7 is a schematic diagram of the display in operation showing a picture with one selected magnification.
Figure 8:
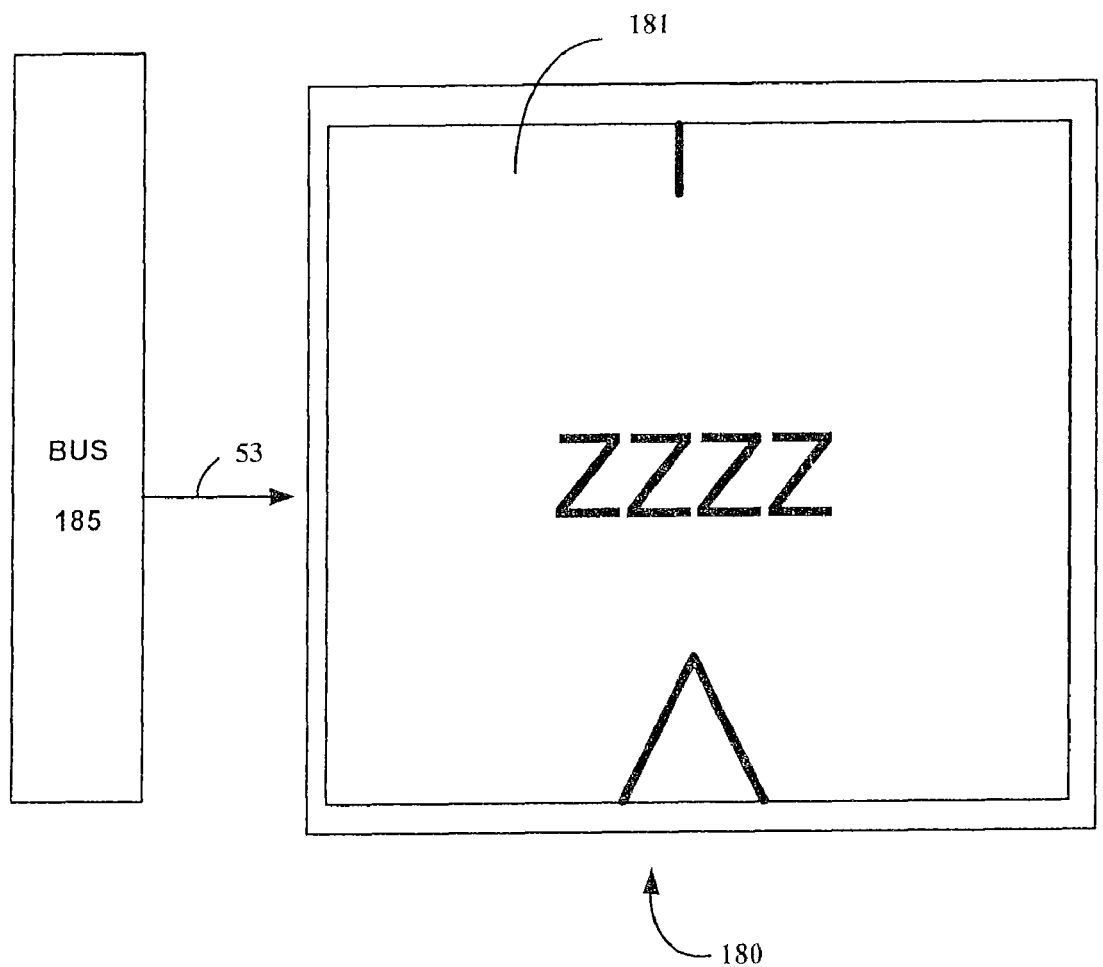
FIG. 8 is a schematic diagram of the display in operation showing a picture with one selected magnification.

FIGS. 6-8 show exemplary display configurations of pictures on display module 180 in response to a received user input 161 at user input module 160. FIGS. 6-8 are intended to demonstrate exemplary user display selections and are not intended to be limiting to the invention.

FIG. 6 is a schematic diagram of the display module 180 in operation showing a picture of the subject with three different magnifications. The display module 180 includes a display area 181 that is segmented into exemplary display sub-areas 182, 183 and 184 for simultaneously displaying pictures of the subject in a wide-angle view, a normal view and a telephoto view. The display module 180 receives color image signals for the subject in the first, second and third magnification along with a command signal to configure the display area 181 to show three separate pictures in display sub-areas 182, 183 and 184. The command signal to configure the display area 181 to show the three pictures in display sub-areas 182-184 is generated by a user input 161 provided to the user input module 160.

Display sub-areas 182, 183 and 184 are positioned in non-overlapping regions of the display area 181 and, in this example, are of equal or almost equal size. The wide-angle representation of the subject is shown in display sub-area 182. The normal representation of the subject is shown in display sub-area 183. The telephoto representation of the subject is shown in display sub-area 184. Display sub-areas 182, 183 and 184 are representative of possible display sub-areas and are not intended to be limiting to the invention.

FIG. 7 is a schematic diagram of the display module 180 in operation showing one picture with a telephoto representation of the subject in display sub-area 184. The display module 180 receives a color image signal representing the subject at the third magnification and a command signal to configure the display area 181 to show the single picture in display sub-area 184. The command signal to configure the display area 181 to display the single picture in display sub-area 184 is generated by a user input 161 provided to the user input module 160.

FIG. 8 is a schematic diagram of the display module 180 in operation showing an alternative way of displaying a picture of a telephoto representation of the subject in which the picture occupies the complete display area 181. The display module 180 receives a color image signal representing the subject at the third magnification along with a command signal to configure the display area 181 to display the picture in the total of display area 181. The command signal to configure the display area 181 to show the picture within all of the display area 181 is generated by a user input 161 provided to the user input module 160.

In one embodiment, the user can select a blanking command signal, which blanks display area 181 or one or more of the display sub-areas 182, 183 or 184. For example, a user may push a clear-all button to clear all pictures in display area 181. In an exemplary case, a user pushes a clear button once within a preset time to clear display sub-area 184 of a picture and the user pushes the clear button twice within a preset time to clear the display sub-areas 183 and 184 of pictures.

Figure 9:
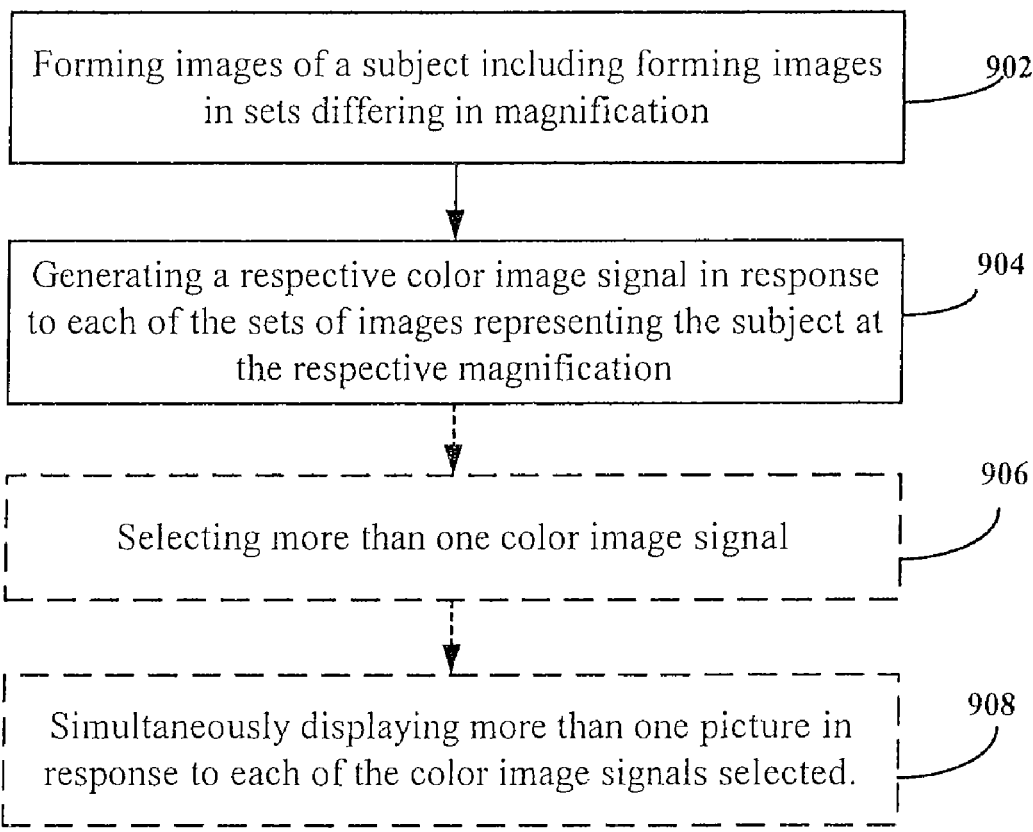
FIG. 9 is a flow chart of a method for color imaging and displaying pictures.

FIG. 9 shows a flow chart 900 illustrating a method in accordance with the present invention for color imaging.

In block 902, images of a subject are formed. The images are formed in sets differing in magnification. The images in each of the sets are formed in light of mutually different colors and have the same magnification. The images differ in magnification among the sets.

In block 904, a respective color image signal is generated in response to each of the sets of images representing the subject at the respective magnification.

In block 906, optionally, more than one color image signal is selected. In block 908, optionally, more than one picture is displayed in response to each of the color image signals selected.

This disclosure describes the invention in detail using illustrative embodiments. However, the invention defined by the appended claims is not limited to the precise embodiments described.

What is claimed is:

1. A color imaging device, comprising:
   a light sensor for generating a plurality of color image signals of a scene at a respective plurality of magnifications; and
   a control module, responsive to user input, for selecting two or more of the plurality of color image signals for display of the scene; and
   a display module for generating a display of the selected color image signals such that each of the select color Image signals displayed on the display module is in a separate viewing area.

2. The color imaging device of claim 1, wherein the control module, in response to the user input, controls at least one of the selection of the color image signals for display or a selection of a color component of the selected color image signals for display.

3. The color imaging device of claim 1, wherein the display module is configured to simultaneously receive the plurality of color image signals and to simultaneously display the selected color image signals using selected color components of the selected color image signals.

4. The color imaging device of claim 3, further comprising:
   a memory for storing the color images signals selected by the control module.

5. The color Imaging device of claim 3, further comprising:
   a processing module for modifying selected color components of the selected color image signals, responsive to the user input.

6. The color imaging device of claim 1, wherein the display module is segmented into the separate viewing areas such that respectively different color image signals are displayed in respectively different ones of the separate viewing areas.

7. The color imaging device of claim 1, wherein the separate viewing areas include at least two of a wide-angle viewing area, a normal viewing area or a telephoto viewing area.

8. The color imaging device of claim 7, wherein the color image signals displayed in the wide-angle viewing area, the normal viewing area and the telephoto viewing area are in respectively different formats.

9. The color imaging device of claim 6, wherein the separate viewing areas are non-overlapping areas and are substantially equal in size.

10. The color imaging device of claim 1, wherein the control module individually controls blanking of each of the separate viewing areas.

11. The color imaging device of claim 1, wherein:
responsive to user input once within a preset time, the control module blanks one of the separate viewing areas; and
responsive to the user input twice within a preset time, the control module blanks more than one of the separate viewing areas.

12. The color imaging device of claim 1, wherein the separate viewing areas are each substantially constant in size while the scene is displayed at a different magnification for each of the separate viewing areas such that in at least one of the separate viewing areas a portion less than an entire view of the scene is displayed.

13. A camera for capturing and displaying images of a scene in a set of magnifications, comprising:
a light sensor for generating a set of color image signals of a scene at a respective set of magnifications; and
lens elements for focusing incident light on the light sensor in a configuration to generate the sets of color image signals;
a control module for selecting one or more of the sets of color image signals for display of the scene;
readout circuits for reading out the sets of color image signals to the control module; and
a display module, coupled to the control module, for generating a display of the selected one or more sets of color image signals.

14. The camera of claim 13, wherein:
the lens elements are each configured to form an image of the scene at a respective magnification, ones of the lens elements respectively forming images of the scene at a common magnification; and
the light sensor disposed opposite the lens elements, and operable to generate, in response to the incident light, respective sets of color image signals, each representing the scene at a respectively different magnification.

15. The camera of claim 13, wherein each respective readout circuit converts a color component of a respective set of the color image signals to a digital image signal component.

16. The camera of claim 15, wherein the digital image signal components from readout circuits associated with each respective set are combined to simultaneously display the scene in a plurality of magnifications.

17. The camera of claim 13, wherein the control module selects for display, based on user input, one or more color components of the one selected set of color image signals.

* * * * *